United States Patent [19]

Shallenberger et al.

[11] Patent Number: 4,688,416

[45] Date of Patent: Aug. 25, 1987

[54] FIXTURE AND METHOD FOR RECTIFYING DAMAGED GUIDE THIMBLE INSERT SLEEVES IN A RECONSTITUTABLE FUEL ASSEMBLY

[75] Inventors: John M. Shallenberger, Fox Chapel; Stephen J. Ferlan, Wilkins Twp., Allegheny County, both of Pa.

[73] Assignee: Westinghouse Electric Corp., Pittsburgh, Pa.

[21] Appl. No.: 797,337

[22] Filed: Nov. 12, 1985

[51] Int. Cl.[4] .................. G21C 19/00; B21D 3/00
[52] U.S. Cl. ............................. 72/367; 72/477; 29/402.05; 29/400 N; 376/261
[58] Field of Search ............... 376/261, 446, 260, 353, 376/449; 29/723, 400 N, 402.05, 402.19; 72/367, 370, 477

[56] References Cited

U.S. PATENT DOCUMENTS

| | | | |
|---|---|---|---|
| 3,904,048 | 9/1975 | Van Santen | 214/27 |
| 4,208,248 | 6/1980 | Jabsen | 376/446 |
| 4,229,259 | 10/1980 | Vaill et al. | 29/723 |
| 4,292,130 | 9/1981 | Viaud et al. | 376/446 |
| 4,358,421 | 11/1982 | Jabsen | 376/271 |
| 4,551,299 | 11/1985 | Shields | 376/261 |
| 4,558,504 | 12/1985 | Le Pargnaux et al. | 376/261 |
| 4,572,816 | 2/1986 | Gjertsen et al. | 29/400 N |
| 4,581,817 | 4/1986 | Kelly | 29/400 N |

FOREIGN PATENT DOCUMENTS

| | | | |
|---|---|---|---|
| 0036821 | 9/1981 | European Pat. Off. | 376/446 |
| 0109902 | 5/1984 | European Pat. Off. | 376/261 |
| 0140588 | 5/1985 | European Pat. Off. | 376/446 |
| 0175974 | 4/1986 | European Pat. Off. | . |
| 0182149 | 5/1986 | European Pat. Off. | . |
| 0187651 | 7/1986 | European Pat. Off. | . |
| 0189797 | 8/1986 | European Pat. Off. | . |
| 2520345 | 11/1976 | Fed. Rep. of Germany | . |
| 2115599 | 9/1983 | United Kingdom | . |
| 2129189 | 5/1984 | United Kingdom | 376/446 |

Primary Examiner—Deborah L. Kyle
Assistant Examiner—Dan Wasil

[57] ABSTRACT

A fixture for rectifying one of several different types of repairable and irreparable damage to the upper end portions, or insert sleeves, of the guide thimbles of a fuel assembly held in a work station includes a base having a plurality of tool positioning openings defined therein in a pattern matched with that of the guide thimbles and several aligning holes for mounting the base on guide members of the work station such that the tool positioning openings are disposed in alignment with the guide thimbles. Also, a plurality of different tools are selectively mountable in the openings of the base. Each tool is adapted to operate to rectify a different one of the types of repairable and irreparable damage to the insert sleeves of the guide thimbles. Movement of the base toward the guide thimbles causes engagement with a guide thimble, and concurrently therewith operation, of each of the tools being mounted to the base which is adapted to rectify a respective one of the different types of guide thimble insert sleeve damage which is repairable. In addition, movement of the base toward the guide thimbles causes placement at an operative position, relative to a guide thimble, of each of the tools being mounted to the base which is adapted to rectify a respective one of the different types of guide thimble insert sleeve damage which is irreparable. Finally, a group of positioning elements is mounted in selected ones of the base openings for precisely locating the fixture relative to the guide thimble insert sleeves for accurate performance of repairable damage rectifying operations by the tools as the fixture is moved toward the guide thimbles.

15 Claims, 24 Drawing Figures

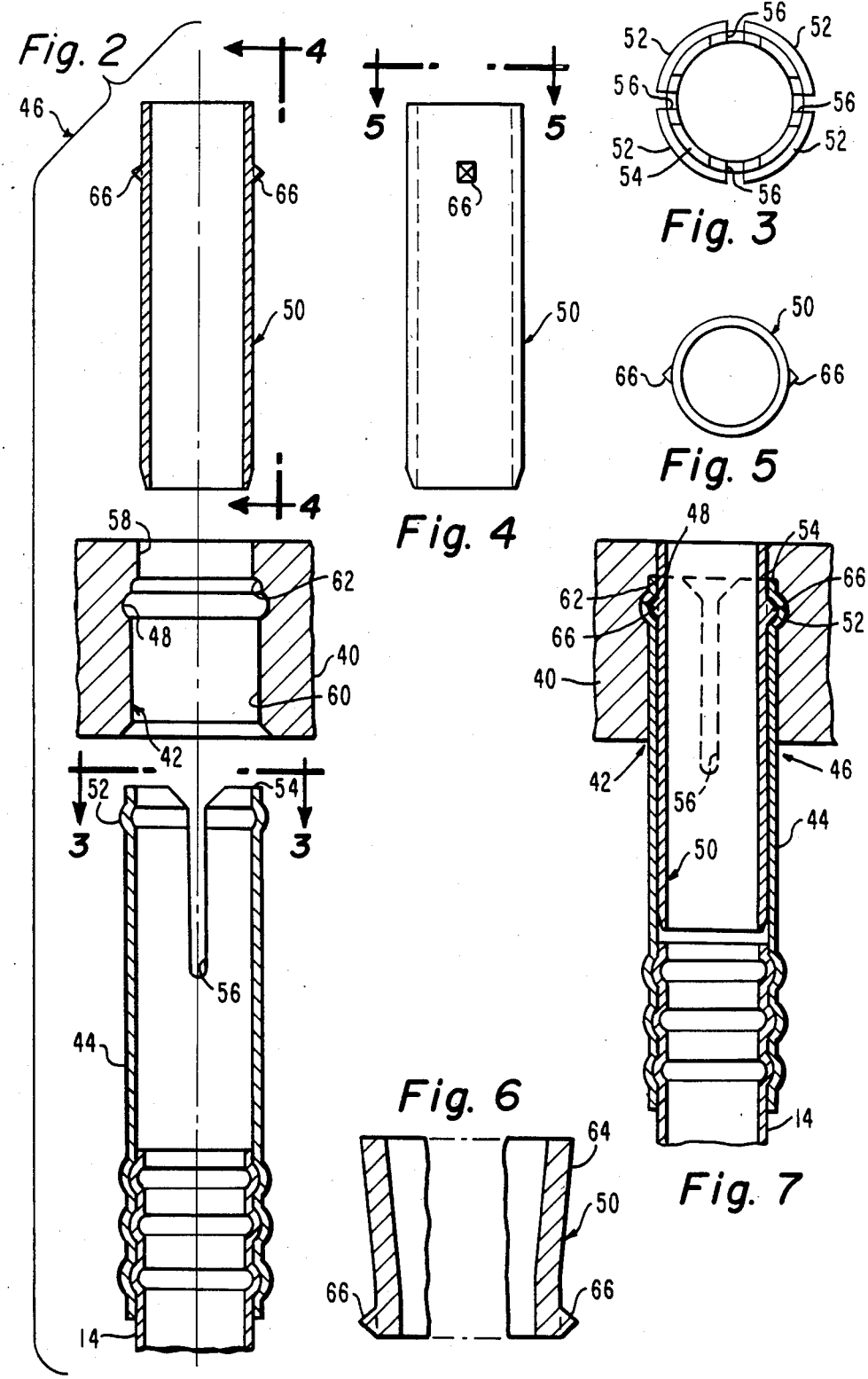

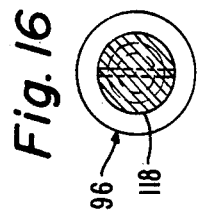
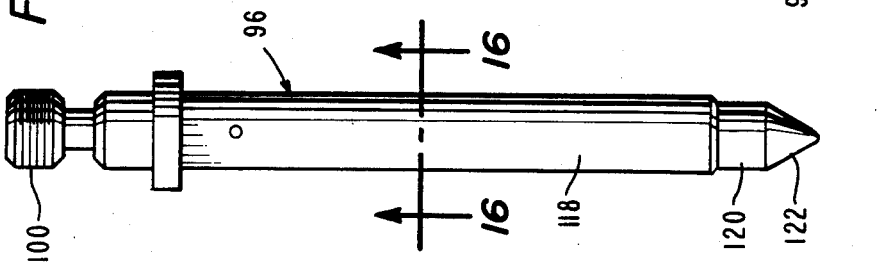
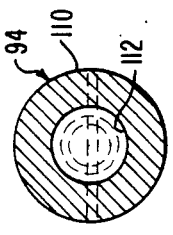
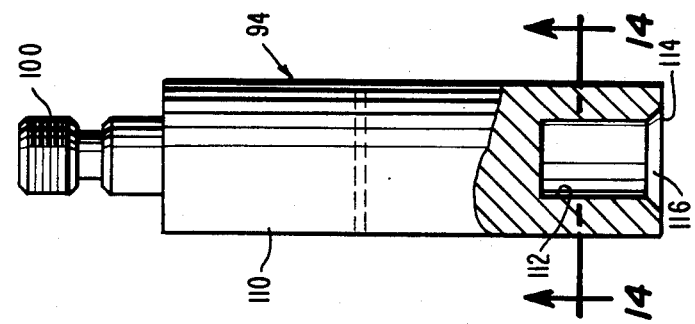
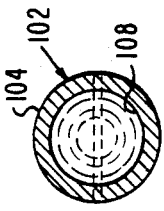
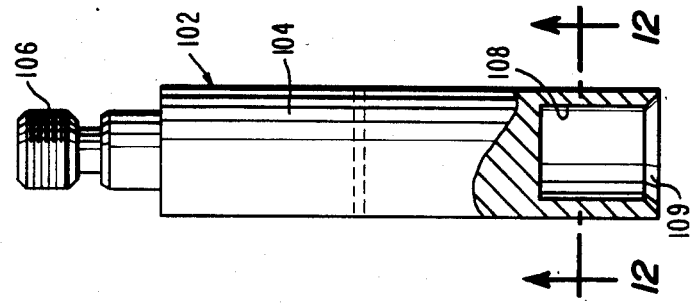

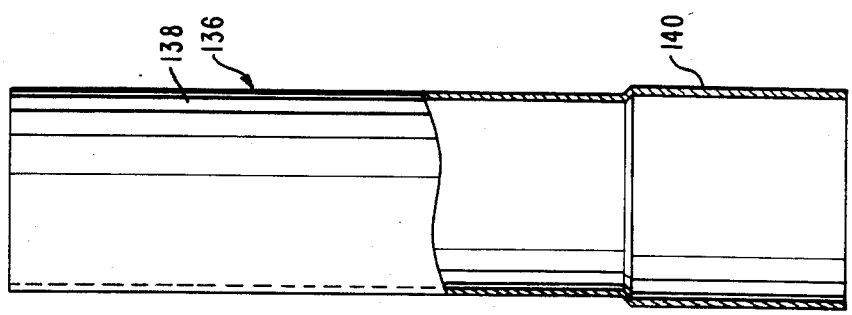
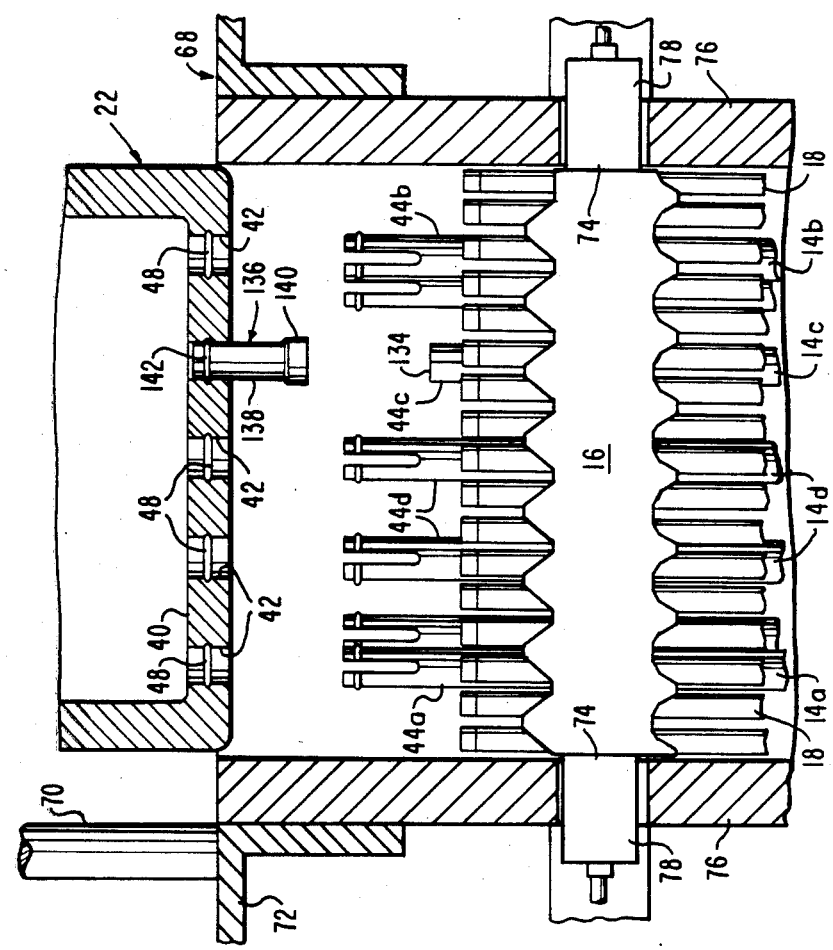

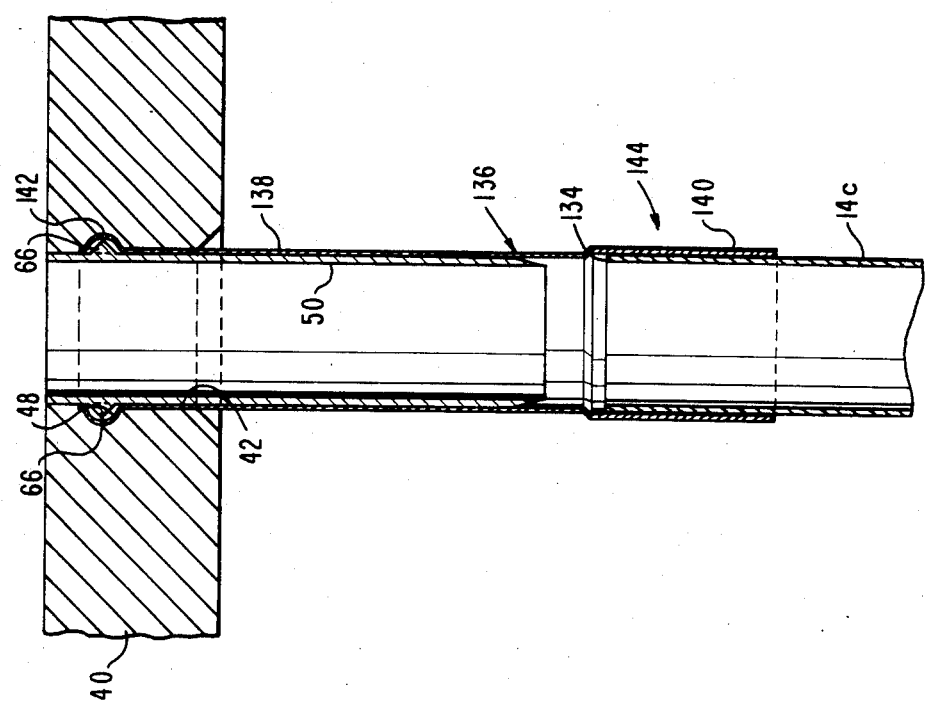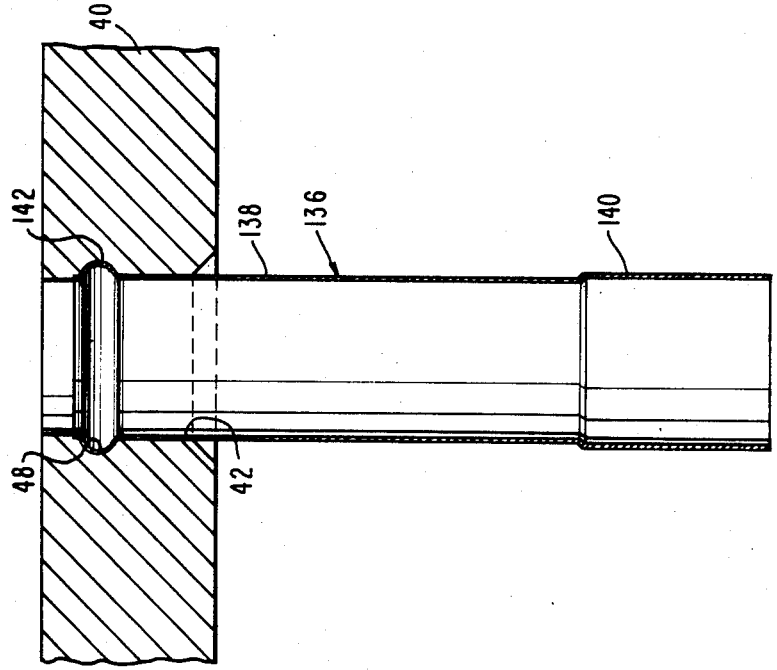

FIXTURE AND METHOD FOR RECTIFYING DAMAGED GUIDE THIMBLE INSERT SLEEVES IN A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly With A Removable Top Nozzle" by John M. Shallenberger et al, assigned U.S. Ser. No. 644,758 and filed Aug. 27, 1984, now U.S. Pat. No. 4,631,168.

2. "Locking Tube Removal And Replacement Tool And Method In A Reconstitutable Fuel Assembly" by John M. Shallenberger et al, assigned U.S. Ser. No. 670,418 and filed Nov. 9, 1984.

3. "Top Nozzle Removal And Replacement Fixture And Method In A Reconstitutable Fuel Assembly" by John M. Shallenberger et al, assigned U.S. Ser. No. 670,729 and filed Nov. 13, 1984.

4. "Locking Tube Insertion Fixture And Method In A Reconstitutable Fuel Assembly" by John M. Shallenberger et al, assigned U.S. Ser. No. 689,696 and filed Jan. 8, 1985.

5. "Locking Tube Removal Fixture And Method In A Reconstitutable Fuel Assembly" by John M. Shallenberger et al, assigned U.S. Ser. No. 695,762 and filed Jan. 28, 1985.

6. "Reusable Locking Tube In A Reconstitutable Fuel Assembly" by John M. Shallenberger et al, assigned U.S. Ser. No. 719,108 and filed Apr. 2, 1985.

7. "Fuel Assembly Skeleton With Structural And Non-Structural Top Nozzle/Guide Thimble Joints" by John M. Shallenberger et al, assigned U.S. Ser. No. 797,333 and filed Nov. 12, 1985.

BACKGROUND OF THE INVENTION

1. Field of the Invention

The present invention relates generally to fuel assemblies for nuclear reactors and, more particularly, is concerned with a fixture and method for rectifying (i.e., repairing or removing) damaged upper end portions of guide thimbles during fuel assembly reconstitution.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array by grids spaced along the fuel assembly length and attached to the control rod guide thimbles. Top and bottom nozzles on opposite ends of the fuel assembly are secured to the guide thimbles which extend slightly above and below the ends of the fuel rods. At the top end of the fuel assembly, the guide thimbles are attached in passageways provided in the adapter plate of the top nozzle. The guide thimbles may each include an upper insert or sleeve for attachment to the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. In response to the high costs associated with replacing fuel assemblies containing defective fuel rods, recently, reconstitutable fuel assemblies have been developed. The general approach to making a fuel assembly reconstitutable is to provide it with a removable top nozzle.

One approach to top nozzle removal is illustrated and disclosed in European Patent Application No. 0 036 821. In one embodiment of this approach, as shown in FIGS. 3, 6 and 7 of the application, the guide thimbles are severed just below the top nozzle adapter plate to allow removal of the top nozzle. Then, a new top nozzle equipped with short tubes having diameters slightly larger than the outside diameter of the guide thimbles are applied to the upper severed ends of the guide thimbles and bulged fitted thereto. However, this approach disadvantageously requires the use of a new top nozzle and only allows the fuel assembly to be reconstituted once.

Another approach to reconstitutable fuel assembly construction is illustrated and described in the first application cross-referenced above. It incorporates a releasable attaching structure for removably mounting the top nozzle on the upper ends of the control rod guide thimbles. Various tools and fixtures used in releasing and installing the attaching structure for removing and replacing the top nozzle are illustrated and described in the second through fifth cross-refreenced applications. A recently devised, reusable locking tube for the attaching structure is illustrated and described in the sixth application cross-referenced above.

The attaching structure includes a plurality of outer sockets defined in an adapter plate of the top nozzle, a plurality of inner sockets with each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expanded locking engagement with the annular groove and prevents the inner socket from being moved to a compressed releasing position in which it could be withdrawn from the outer socket. In such manner, the locking tubes maintain the inner sockets in locking engagement with the outer sockets, and thereby the attachment of the top nozzle on the upper ends of the guide thimbles.

Although unlikely, the possibility exists that during a fuel assembly reconstitution operation, while the top nozzle is removed from the irradiated fuel assembly to provide access to any defective fuel rod, the upper end portion, or insert sleeve, of the guide thimble could be inadvertently damaged by tooling or by a dropped object which strikes the guide thimble upper portion. Should such a mishap occur, the fuel assembly could be rendered unacceptable for further reactor service if the damaged portion cannot enter the respective top nozzle adapter plate passageway and be properly secured by the respective locking tube.

Consequently, there is a need for a workable repair approach to rectify (i.e., repair or remove) and accommodate damaged guide thimble upper end portions which effectively addresses potential customer concerns related to improbable, but possible, mishaps which could jeopardize successful fuel reconstitution.

SUMMARY OF THE INVENTION

The present invention together with the invention of the seventh application cross-referenced above are designed to satisfy the aforementioned needs by providing contingency reconstitution equipment and a top nozzle/guide thimble joint modification designed to rectify (i.e., repair or remove) and accommodate damaged guide thimble upper end portions.

The present invention relates to a fixture and method for rectifying damaged guide thimble upper end portions. In particular, a remotely-operated fixture is operable to repair moderately damaged guide thimble portions and cut off irreparably damaged portions, thus permitting the remounting of the top nozzle on the repaired and severed portions of the guide thimbles and the continued use of the reconstituted fuel assembly in the reactor.

In cases where the damaged guide thimble portions are irreparable and must be cut off, the invention of the last cross-referenced application presents a modified top nozzle attachment concept compatible with fuel assembly skeletons containing several severed guide thimble upper end portions, or insert sleeves. Specifically, in the modified top nozzle, a non-structural joint in substituted for the severed guide thimble portion which previously provided a structural joint with the top nozzle adapter plate. Depending upon the particular fuel assembly configuration, at least four to six removable top nozzle/guide thimble structural joints can be eliminated without increasing the load carried by the remaining structural joints to an unacceptable level.

Accordingly, the present invention sets forth for use with a reconstitutable fuel assembly being held in a work station with its top nozzle removed to expose a plurality of guide thimbles of the assembly, at least one of the guide thimbles having one of several different types of damage, a fixture and method for rectifying the guide thimble damage.

The guide thimble damage rectifying fixture includes: (a) a base having a plurality of tool positioning openings defined therein in a pattern matched with that of the guide thimbles of the assembly; (b) means for mounting the base on the work station with its tool positioning openings in alignment with the guide thimbles of the fuel assembly; and (c) a plurality of different tools selectively mountable in the openings of the base, each tool being operable to rectify one of the different types of guide thimble damage. Also, the fixture includes means for moving the base toward the guide thimbles so as to cause engagement with a guide thimble, and concurrently therewith operation, of each of the tools being mounted on the base which is adapted to rectify a respective one of the different types of guide thimble damage which is repairable. Further, the moving means moves the base toward the guide thimbles so as to cause placement at an operative position relative to a guide thimble of each of the tools mounted on the base which is adapted to rectify a respective one of the different types of guide thimble damage which is irreparable.

More particularly, one of the tools is a compressor socket operable to rectify repairable damage to one of the guide thimbles in the form of an outwardly bent upper end portion thereof by compressing the bent portion inward to its original position. Another one of the tools is an expander pin operable to rectify repairable damage to one of the guide thimbles in the form of an inwardly bent upper end portion thereof by expanding the bent portion outward to its original position. Still another one of the tools is a cutter operable to rectify irreparable damage to an upper end portion of one of the guide thimbles by severing and capturing the irreparably damaged portion.

Still further, the fixture includes a group of positioning elements selectively mounted in a corresponding number of the openings of the base for precisely locating the fixture relative to the guide thimbles for accurate performance of the damage rectifying operation by each of the tools. Specifically, each of the positioning elements is a non-compresser socket adapted to mount on an upper end portion of an undamaged one of the guide thimbles.

The method for rectifying the guide thimble damage includes the steps of: (a) providing a base having a plurality of tool positioning openings defined therein in a pattern matched with that of the guide thimbles of the assembly; (b) mounting the base on the work station with its tool positioning openings in alignment with the guide thimbles of the fuel assembly; (c) providing a plurality of different tools each operable to rectify one of the different types of guide thimble damage; and (d) mounting selected ones of the plurality of different tools in respective ones of the openings of the base being aligned with ones of the guide thimbles having the respective types of guide thimble damage capable of being rectified by the selected tools. Furthermore, the method also includes the step of moving the base toward the guide thimbles so as to cause engagement with a guide thimble, and concurrently therewith operation, of each of the tools being mounted on the base which is adapted to rectify a respective one of the different types of guide thimble damage which is repairable and cause placement at an operative position relative to a guide thimble of each of the tools being mounted on the base which is adapted to rectify a respective one of the different types of guide thimble damage which is irreparable.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is a sectioned, exploded view of the components of the attaching structure associated with the top nozzle and the guide thimbles of the reconstitutable fuel assembly.

FIG. 3 is a top plan view, as seen along line 3—3 of FIG. 2, looking down on the top of the upper end of the control rod guide thimble.

FIG. 4 is a side elevational view of the reusable locking tube of the attaching structure by itself.

FIG. 5 is a top plan view, as seen along line 5—5 of FIG. 4, looking down on the top of the reusable locking tube.

FIG. 6 is an enlarged fragmentary view of the upper end of the improved reusable locking tube of FIG. 2, showing a slightly outwardly tapered or flared upper peripheral edge portion thereof.

FIG. 7 is a sectional view of the components of the attaching structure of FIG. 2 being assembled together.

FIG. 11 is an enlarged elevational view, with portions broken away and sectioned, of the positioning element in the form of a non-compresser socket which was shown mounted to the fixture base in FIG. 8 but removed from the fixture base in FIG. 9.

FIG. 12 is a cross-sectional view of the positioning element as taken along line 12—12 of FIG. 11.

FIG. 13 is an enlarged elevational view, with portions broken away and sectioned, of the compresser socket tool which was shown mounted to the fixture base in FIG. 8 but removed from the fixture base in FIG. 10.

FIG. 14 is a cross-sectional view of the compresser socket tool as taken along line 14—14 of FIG. 13.

FIG. 15 is an enlarged elevational view of the expander pin tool which was shown mounted to the fixture base in FIG. 8 but removed from the fixture base in FIG. 10.

FIG. 16 is a cross-sectional view of the expander pin tool as taken along line 16—16 of FIG. 15.

FIGS. 19 through 21 are sectional views similar to that of FIG. 18, but showing sequential stages in the rectification of damaged guide thimble insert sleeves by the fixture of the present invention including in FIG. 19, the lowering of the fixture to repair inserts with respective outwardly and inwardly flared or bent upper end segments and to sever an insert with irreparable damage; in FIG. 20, the removal of the fixture with the severed insert portion being carried therewith; and in FIG. 21, the replacement of the top nozzle back on the guide thimbles with the top nozzle carrying an adapter sleeve which will form a modified non-structural joint with the severed guide thimble insert sleeve in accordance with the invention of the last cross-referenced application.

FIG. 22 is an enlarged elevational view, with portions broken away and sectioned, of the adapter sleeve which is used to form the modified non-structural joint in accordance with the invention of the last cross-referenced application.

FIG. 23 is an enlarged fragmentary view, in section, of the top nozzle shown in FIG. 21, illustrating the bulge fitted connection of the adapter sleeve in the passageway groove of the top nozzle adapter plate.

FIG. 24 is a view similar to that of FIG. 23, but showing the adapter sleeve inserted over the severed guide thimble insert sleeve and the locking tube installed in the adapter sleeve.

DETAILED DESCRIPTION OF THE INVENTION

Figure 1:
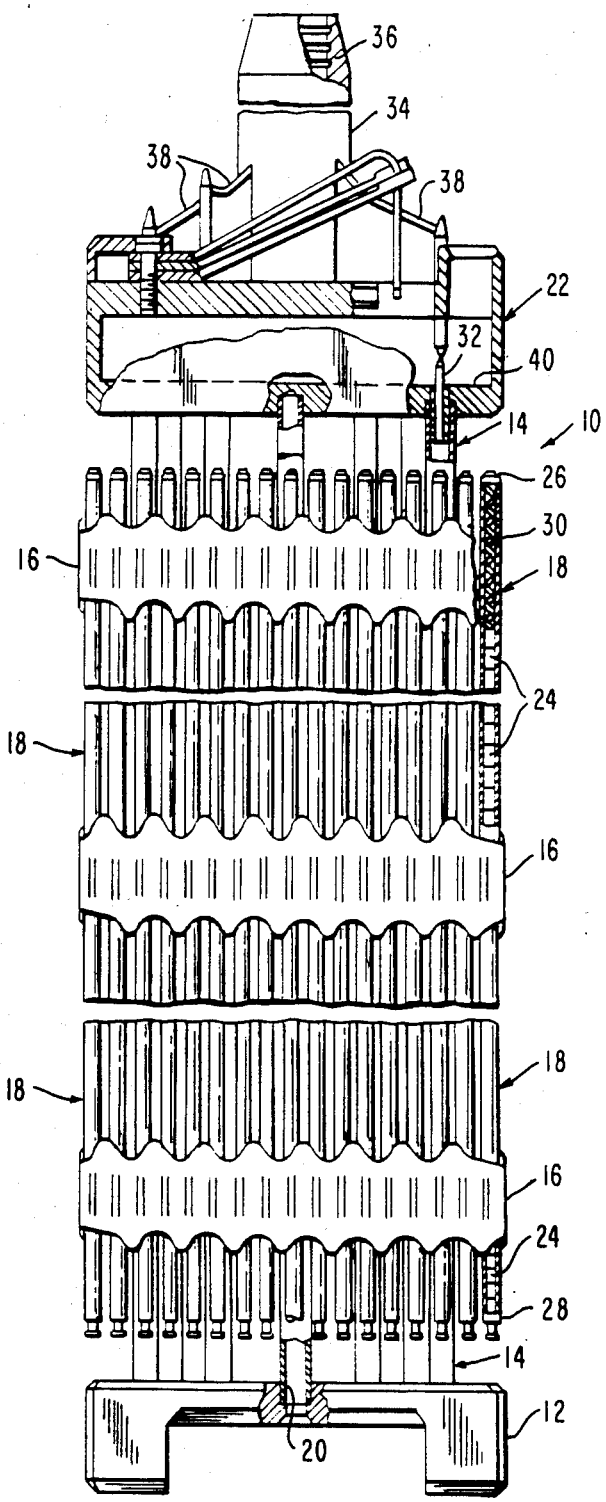
FIG. 1 is a side elevational view, with parts partially sectioned and broken away for purposes of clarity, of a reconstitutable fuel assembly upon which the apparatus and method of the present invention can be employed to recitfy (i.e., repair or remove) damaged upper end portions of the fuel assembly guide thimbles.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a reconstitutable nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14, in a manner fully described below, to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

TOP NOZZLE ATTACHING STRUCTURE

As illustrated in FIGS. 2 and 7, the top nozzle 22 has a lower adapter plate 40 with a plurality of control rod passageways 42 (only one being shown) formed through the adapter plate. The control rod guide thimbles 14 have their uppermost end portions 44 coaxially positioned within the passageways 42 in the adapter plate 40. For gaining access to the fuel rods 18 in reconstitution of the fuel assembly 10, the adapter plate 40 of the top nozzle 22 is removably connected to the upper end portions 44 of the guide thimbles 14 by an attaching structure, generally designated 46, which provides a plurality of structural joints between the top nozzle and the guide thimbles of the fuel assembly skeleton. The attaching structure 46 is generally the same as illustrated and described in the sixth application cross-referenced above, but will be described herein to the extent necessary to facilitate an understanding of the present invention.

As best seen in FIGS. 2 through 7, the top nozzle attaching structure 46 of the reconstitutable fuel assembly 10 includes a plurality of outer sockets (only one being shown) defined in the top nozzle adapter plate 40 by the plurality of passageways 42 (also only one being shown) which each contains an annular circumferential groove 48 (only one being shown), a plurality of inner sockets (only one being shown) defined on the upper end portions 44 (only one being shown) of the guide thimbles 14, and a plurality of removable and reusable locking tubes 50 (only one being shown) inserted in the inner sockets to maintain them in locking engagement within the outer sockets.

Each inner socket is defined by an annular circumferential bulge 52 on the hollow upper end portion 44 of one guide thimble 14 only a short distance below its upper edge 54. A plurality of elongated axial slots 56 are formed in the upper end portion 44 of each guide thimble 14 to permit inward elastic collapse of the slotted end portion to a compressed position so as to allow the circumferential bulge 52 thereon to be inserted within and removed from the annular groove 48 via the adapter plate passageway 42. The annular bulge 52 seats in the annular groove 48 when the guide thimble end portion 44 is inserted in the adapter plate passageway 42 and has assumed an expanded position. In such manner, the inner socket of each guide thimble 14 is inserted into and withdrawn from locking engagement with one of the outer sockets of the adapter plate 40.

More particularly, the axially extending passageway 42 in the adapter plate 40 which defines the outer socket is composed of an upper bore 58 and a lower bore 60. The lower bore 60 is of considerably greater axial length than the upper bore 58 and contains the annular groove 48 which is spaced a short distance below a ledge 62 formed at the intersection of the upper and lower bores 58,60. The lower bore 60 has a diameter which is greater than that of the upper bore 58; therefore, the ledge 62 faces in a downward direction. The primary purpose of the ledge 62 is to serve as a stop or an alignment guide for proper axial positioning of the upper end portion 44 in the passageway 42 when the inner socket is inserted into the outer socket. As seen in FIG. 7, the upper edge 54 of the guide thimble 14 abuts the ledge 62.

Finally, each locking tube 50 is inserted from above the top nozzle 22 into its respective locking position in the hollow upper end portion 44 of one guide thimble 14 forming one inner socket. When the locking tube 50 is inserted in its locking position, as seen in FIG. 7, it retains the bulge 52 of the inner socket in the latter's expanded locking engagement with the annular groove 48 and prevents the inner socket from being moved to its compressed releasing position in which it could be withdrawn from the outer socket. In such manner, each locking tube 50 maintains its respective one inner socket in locking engagement with the outer socket, and thereby retains the structural joint formed by the attachment of the adapter plate 40 of the top nozzle 22 on the upper end portion 44 of each guide thimble 14 in an assembled rigid form.

Also, the locking tube 50 includes a slightly outwardly flared (for instance 1-2 degrees) upper peripheral marginal edge portion 64 (FIG. 6), which has an outer diameter slightly larger than the diameter of the upper bore 58, and a pair of small dimples 66 (being shown exaggerated in size) to secure it in its locking position. The flared edge portion 64 provides a tight frictional fit with the adapter plate 40, whereas the dimples 66 extend into the circumferential groove 48 defined in the adapter plate passageway 42. The locking tube 50 will yield as a whole in allowing withdrawal of the dimples 66 from the groove 48 and the tube from its locking position, after which the locking tube 50 will spring back to its original shape.

APPARATUS FOR RECTIFYING DAMAGED GUIDE THIMBLE UPPER ENDS

Figure 8:
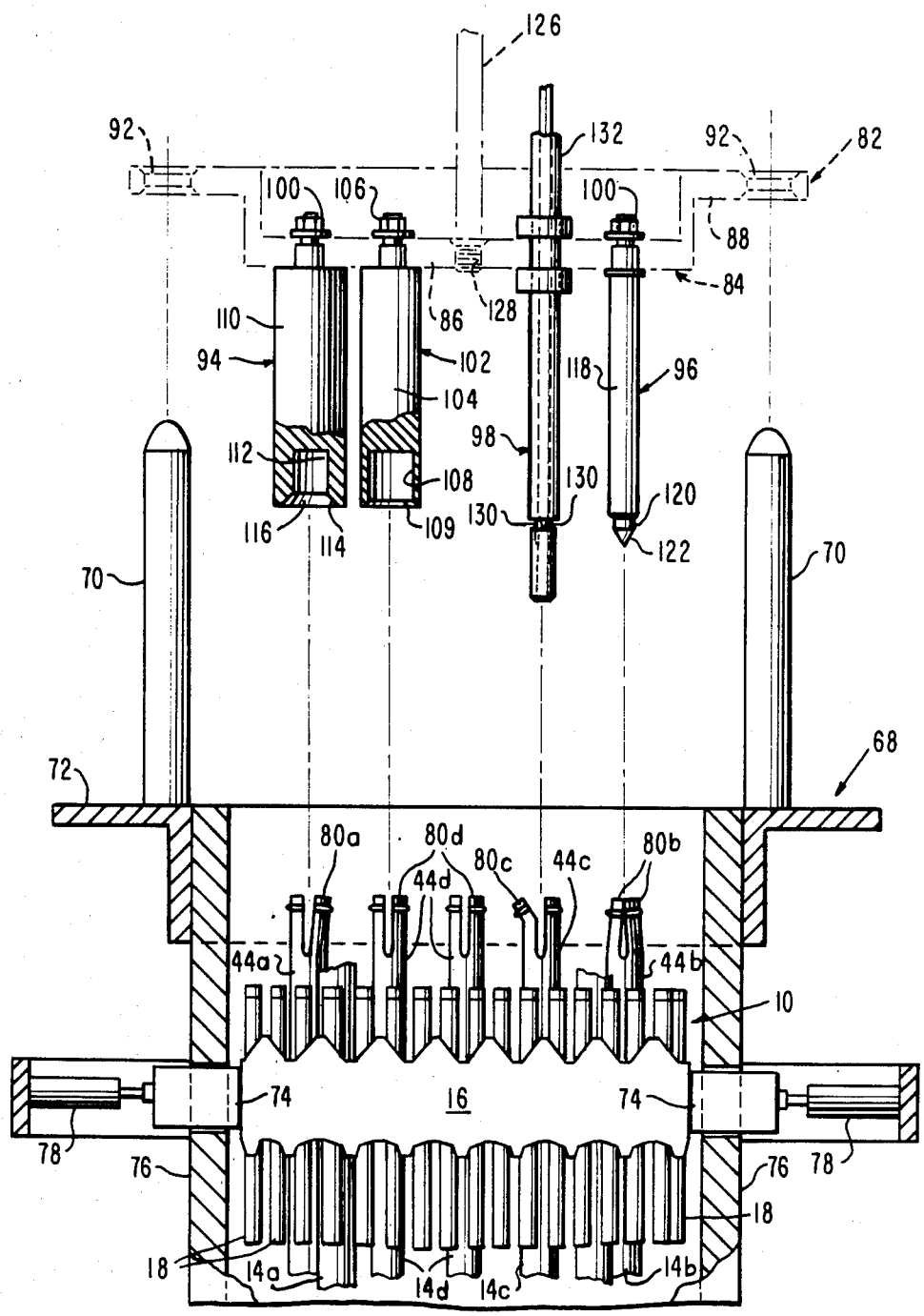
FIG. 8 is a fragmentary side elevational view of a reconstitutable fuel assembly disposed in a submerged work station, with the damage rectifying fixture of the present invention positioned above the work station and fuel assembly in alignment therewith, and with the top nozzle of the fuel assembly being removed to expose guide thimbles having the different possible types of upper end portion damage which can be rectified by operation of the fixture.

Turning now to FIG. 8, for effectuating inspection, removal, replacement and/or rearrangement of fuel rods 18 contained in the reconstitutable fuel assembly 10, the irradiated assembly must be removed from the reactor core and lowered into a work station 68 by means of a standard fuel assembly handling tool (not shown). In the work station 68, the fuel assembly 10 is submerged in coolant and thus maintenance operations are performed by manipulation of remotely-controlled submersible equipment. One component of such equipment is used for removing and replacing the locking tubes and another component is used, after the locking tubes have been removed, for removing and subsequently replacing the top nozzle 22 from and on the guide thimbles 14 of the reconstitutable fuel assembly 10. These components can take the form of the ones described and illustrated in the second through fifth application cross-referenced above.

The work station 68 includes a pair of elongated bullet-nose guide members 70 which are mounted on, and project upwardly from, a pair of diagonal corners of a top flange 72 of the work station 52. The guide members 70 assist in alignment of the various components used to remove the locking tubes 50 and remove and replace the top nozzle 22. Also, included in the work station 68 are opposed pairs of movable pads 74 (only one pair being shown) that are mounted on and project through the side walls 76 of the work station at the elevation of the uppermost grid 16 of the fuel assembly 10. The pads 74 are advanced inwardly by cylinders 78, also mounted on the side walls 76, to bear against each side of the grid 16 and take up the clearance between the station 68 and the assembly 10, and thus maintain it in a fixed relation to the work station.

In FIG. 8, there is also depicted three general types of damage which, although improbable, could possibly happen to the upper end portions 44 (or insert sleeves) of the guide thimbles 14, and particularly to the segments 80 thereof being separated by axial slots 56, should they be hit by a dropped object or bumped by a piece of equipment during reconstitution of the fuel assembly 10 when the top nozzle 22 is removed from the assembly and the guide thimbles 14 are exposed from above. The first type of segment damage, being represented on guide thimble upper end portion 44a, involves one (or more) of the segments 80a being flared or bent outwardly away from its desired vertical position. In such position of the segment 80a, the damaged upper end portion 44a of the guide thimble 14a will not fit into the corresponding passageway 42 in the top nozzle adapter plate 40 when the top nozzle is replaced on the guide thimbles. The second type of segment damage, being represented on guide thimble upper end portion 44b, involves one (or more) of the segments 80b being bent inwardly away from its desired vertical position. In such position of the segment 80b, the damaged upper end portion 44b of the guide thimble 14b may fit into the corresponding adapter plate passageway 42, but will not seat properly in the groove 48 therein nor will it receive one of the locking tubes 50.

However, in view of the present invention, each of the first and second types of segment damage are considered to be directly repairable, as will be explained shortly. Such is not the case with the third type of damage, being represented on the guide thimble upper end portion 44c. It involves one (or more) of the segments 80c being too severely bent outwardly or damaged to be directly repairable, such as by bending it back to its desired vertical position. Nonetheless, the present invention makes provision for rectifying the damage by removing the affected section of the upper end portion 44c, as also will be explained shortly. Then, in accordance with the invention of the last cross-referenced application, which will also be described below, a substitute or replacement structure is provided for the removed section.

Turning now to FIGS. 9 through 16, as well as to FIG. 8, there is shown a fixture, constituting the preferred embodiment of the present invention and being generally designated 82, which can be used during reconstitution of the fuel assembly 10, if the need arises, to rectify (i.e., repair or remove) damage to any of the axially segmented upper end portions 44 of the fuel assembly guide thimbles 14. With the top nozzle 22 removed from the fuel assembly 10, it is possible although highly improbable that, during fuel assembly reconstitution operations, at least one of the guide thimble segments 80 may incur one of the three different types of repairable and irreparable damage which were briefly described above.

Figure 9:
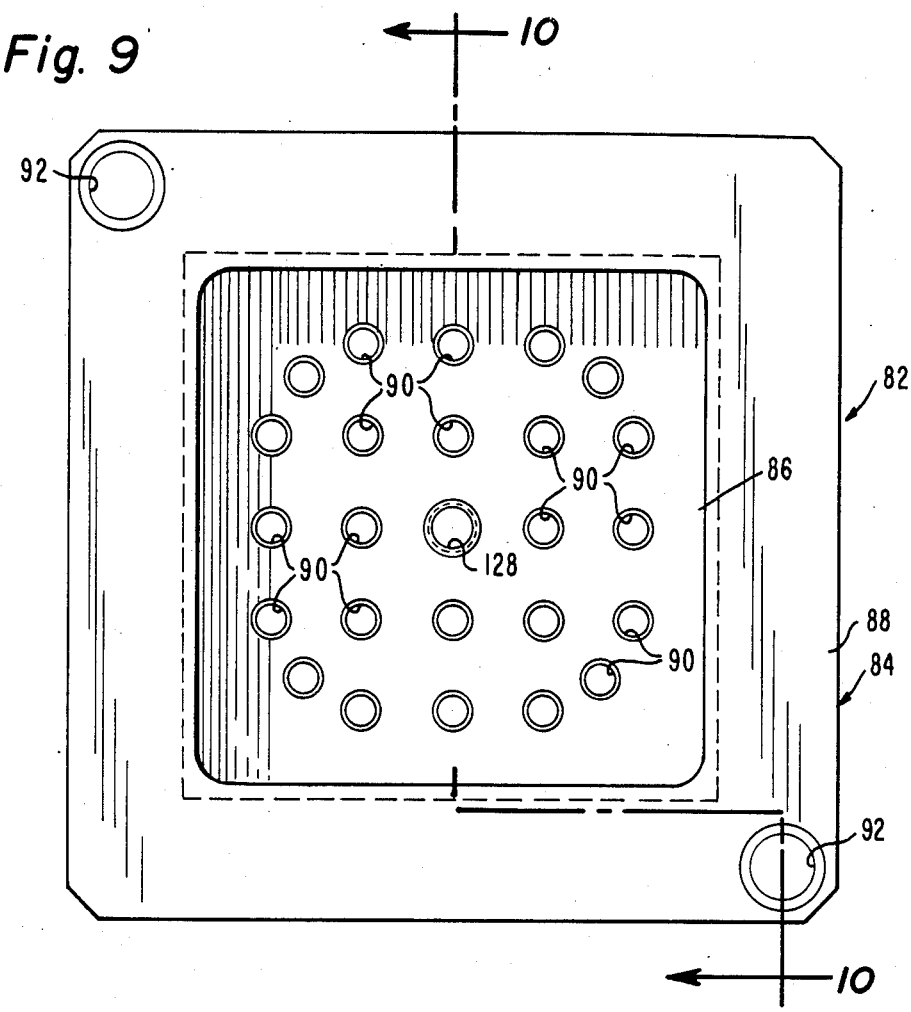
FIG. 9 is an enlarged top plan view of the base of the fixture of FIG. 8, illustrating the base with the various repair and cutting tools and positioning elements of the fixture removed from the base.
Figure 10:
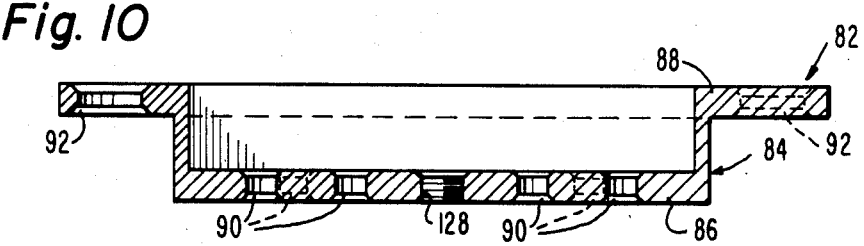
FIG. 10 is a sectional view of the fixture base as taken along line 10—10 of FIG. 9.
Figure 18:
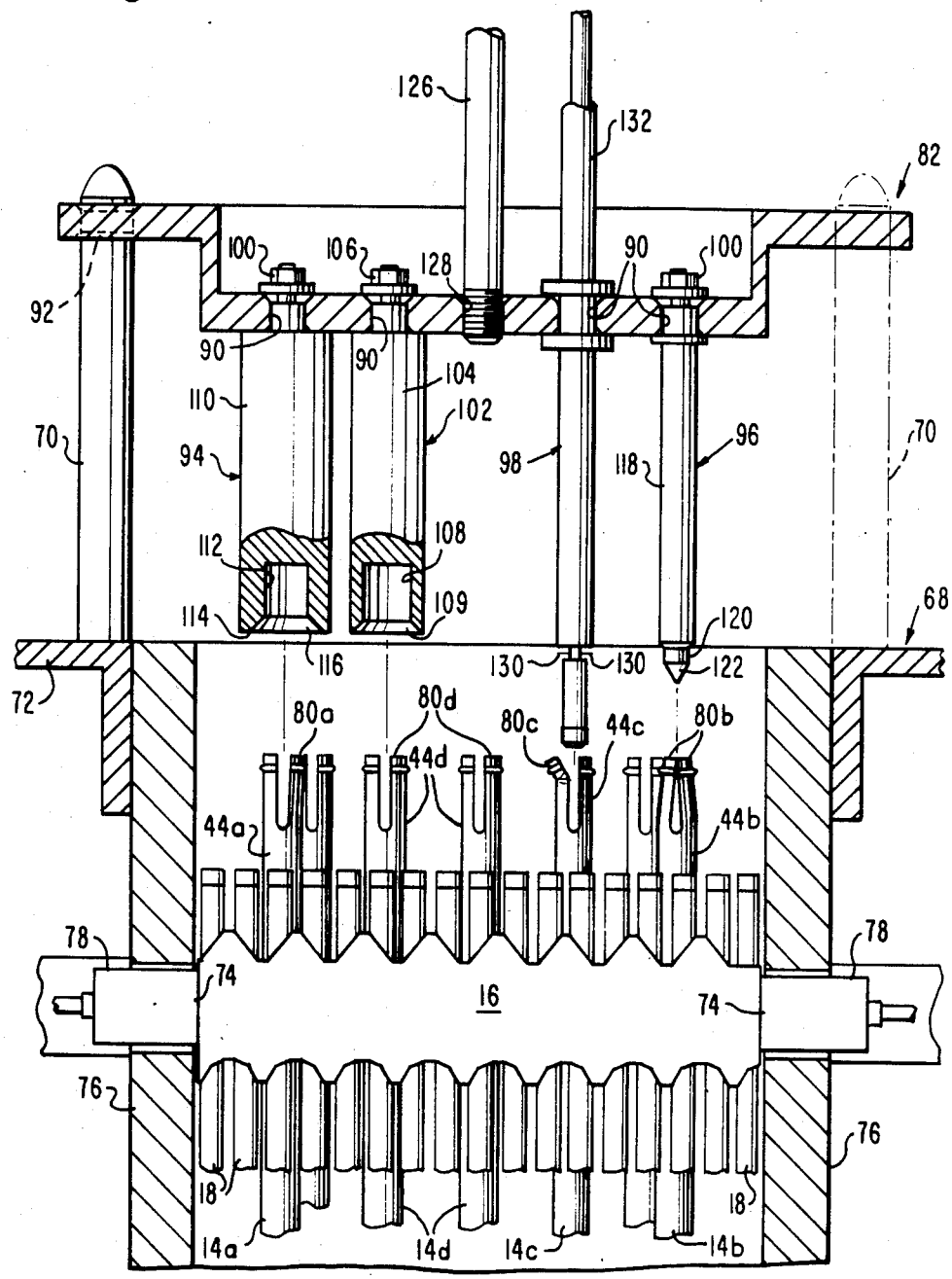
FIG. 18 is a sectional view of the submerged work station and the damage rectifying fixture in operative starting position over the fuel assembly as taken along line 18—18 of FIG. 17.

As shown particularly in FIGS. 9 and 10, the damage rectifying fixture 82 includes a base 84 made up of a generally square plate 86 enclosed by and connected with a frame 88. The plate 86 has a plurality of tool positioning openings 90 defined therein in a pattern matched with that of the guide thimbles 14. The frame 88 has means for mounting the base 84 on the work station 68 in the form of a pair of aligning holes 92 defined in two opposite corners of the frame for receiving the guide members 70 which project upward from the top flange 72 of the work station. When the base 84 is positioned above the station 68, as seen in FIG. 8, and then lowered to just receive the guide members 70 of the station upwardly through its aligning holes 92, as seen in FIG. 18, the tool positioning openings 90 of the base 84 are then disposed in alignment with the exposed upper end portions 44 of the fuel assembly guide thimbles 14.

Further, the damage rectifying fixture 82 incorporates a set of three different tools 94,96,98 corresponding to the three different types of damage which can be incurred by the guide thimbles 14, as described above. Each of the tools 94,96,98 is selectively mountable to the base plate 86 at any one of its openings 90 by a threaded nut and bolt connection 100 provided on the upper end of the tool. Basically, therefore, each tool is adapted to operate to rectify a different one of the types of repairable and irreparable damage to the segments 80 on the upper end portions 44 of the guide thimbles 14. (It will be recalled that the portions 44, which commonly take the form of insert sleeves, form the structural joints with the top nozzle adapter plate 40, when the top nozzle 22 is remounted on the guide thimbles 14, as was described earlier).

Figure 19:
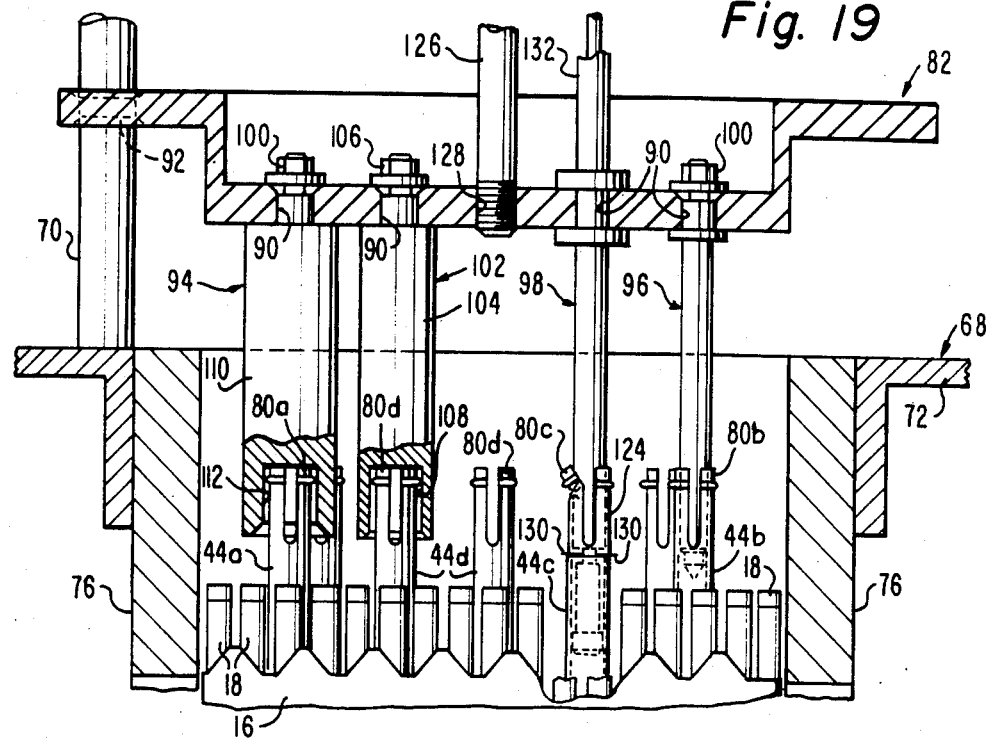

In addition to the damage rectifying tools 94,96,98, the fixture 82 incorporates a group of positioning elements 102 mounted in selected ones of the base openings 90 which will not be occupied by any of the tools. Each of positioning elements 102, as best seen in FIGS. 11 and 12, is a non-compresser socket having a cylindrical body 104 attached to the base plate 86 at one of the openings 90 by a threaded connection 106 and a cylindrical cavity 108 defined in the lower end of the body. The body 104 has outwardly tapered lower guide opening 109 defined therein which leads into the cavity 108. The cavity 108 is of a diameter size slightly larger than the outside diameter size of an undamaged one of the upper end portions 44 which adapts the positioning element 102 to mount upon the undamaged guide thimble upper end portion 44d, as seen in FIG. 19. Thus, selection of the specific positioning holes 90 in the fixture base 84 for attachment of the non-compresser socket elements 102 shall correspond to undamaged guide thimble portions 44d, preferably four in number (only one is shown in the drawings for purposes of clarity), with one in each quadrant of the fuel assembly skeleton. The function of the positioning elements 102 is to precisely locate the fixture 82 relative to the guide thimble upper end portions 44 for ensuring accurate performance of the damage rectifying operations carried out by the tools 94,96,98. Specifically, the purpose of the socket elements 102 is to locate the fixture 82 at a precise distance above and parallel to the normal plane of the top edges 54 of the guide thimbles.

In FIGS. 13 and 14, as well as in FIG. 8, the damage rectifying tool 94 is the one designed to repair the first type of damage described above with respect to one (or more) of the segments 80a on the guide thimble upper end portion 44a. The tool 94 takes the form of a compressor socket having a cylindrical body 110 attached to the base plate 86 at one of the openings 90 by the threaded connection 100 and a cylindrical cavity 112 defined in the lower end of the body. The body 110 has an outwardly tapered lower edge 114 defining a guide opening 114 leading into the cavity 112. The cavity 112 is of a diameter size generally slightly less than the outside diameter size of an undamaged one of the upper end portions 44 which adapts the compresser socket tool 94 to operate to rectify repairable damage to the guide thimble upper end portion 44a having an outwardly bent segment 80a by compressing the segment 80a inward to its original position, as seen in FIG. 19. Thus, compressor socket tools 94 would be attached at positioning holes 90 of the base 84 corresponding to those of the guide thimbles having damage of the first type.

In FIGS. 15 and 16, as well as in FIG. 8, the damage rectifying tool 96 is the one designed to repair the second type of damage described above with respect to one (or more) of the segments 80b on the guide thimble upper end portion 44b. The tool 96 takes the form of an expander pin having a cylindrical body 118 attached to the base plate 86 at one of the openings 90 by the threaded connection 100 and a reduced diameter lower section 120 with a tapered guide end 122 defined on the lower end of the body. The body 118 has a diameter size generally slightly less than the inside diameter of an undamaged one of the upper end portions 44 which adapts the expander pin tool 96 to operate to rectify repairable damage to the guide thimble upper end portion 44b having an inwardly bent segment 80b by expanding the segment 80b outward to its original position, as seen in FIG. 19. Thus, expander pin tools 96 would be attached at positioning holes 90 of the base 84 corresponding to those of the guide thimbles having damage of the second type.

Figure 20:
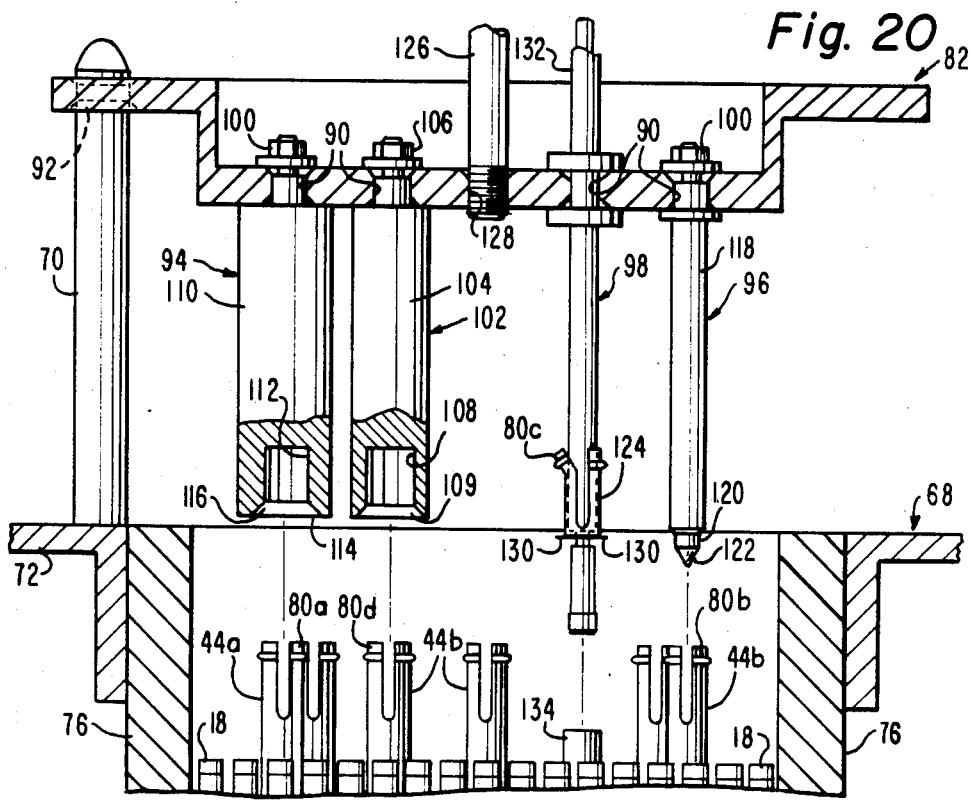

Finally, the tool 98, being the one to rectify the third type of damage, preferably takes the form of a precision internal cutter, such as either one of the two embodiments disclosed and illustrated in U.S. application Ser. No. 649,864 and assigned to the assignee of the present invention, the disclosure of which is incorporated by reference. The cutter tool 98 is operable to rectify irreparable damage to one (or more) of the bent segments 80c of the guide thimble upper end portion 44c by severing and capturing a predetermined section 124 of the guide thimble upper end portion 44c which includes the irreparably damaged segment 80c, as seen in FIGS. 19 and 20.

Figure 17:
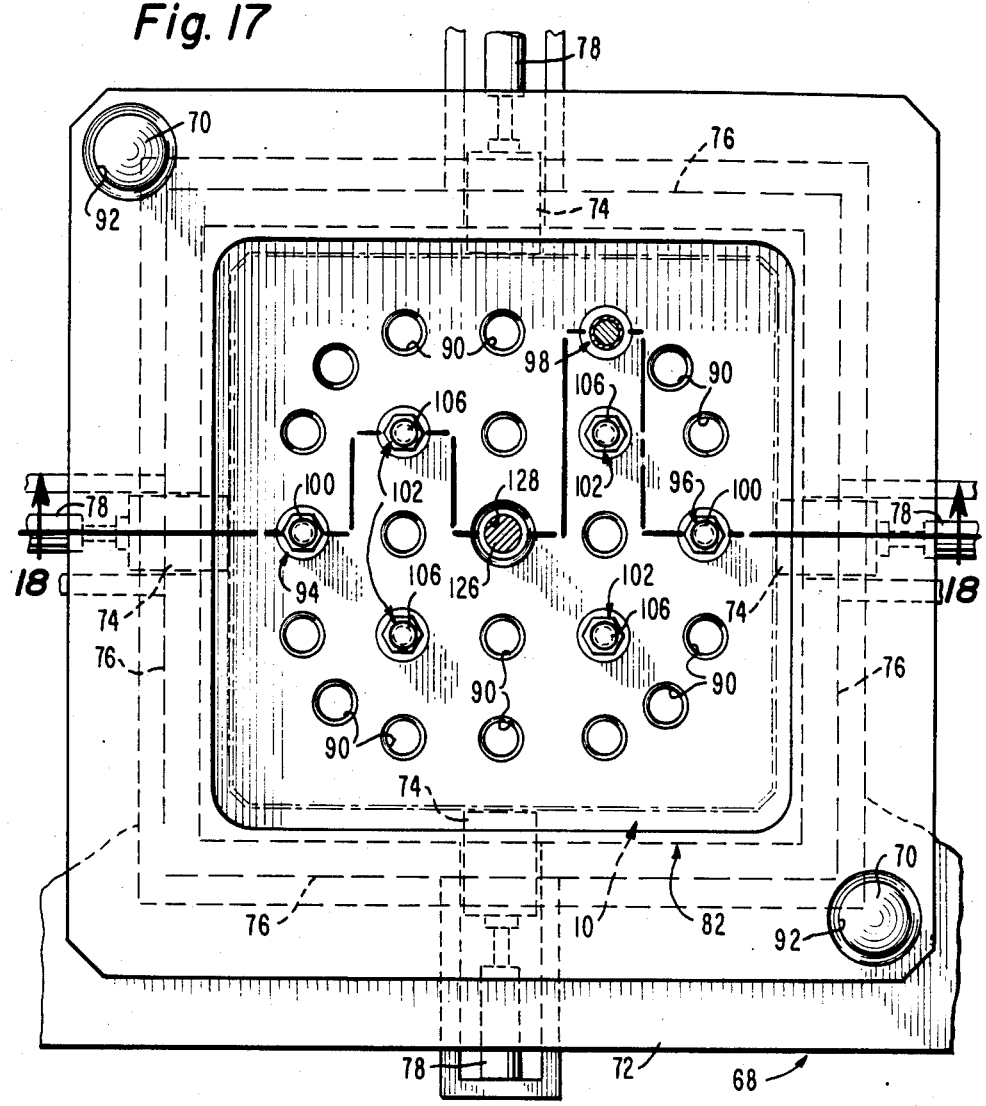
FIG. 17 is a top plan view of the damage rectifying fixture mounted at the submerged work station in operative starting position overlying a fuel assembly whose damaged guide thimble upper end portions or insert sleeves are to be repaired or removed depending on the type of damage incurred by the sleeves.

In FIGS. 17 and 18, the damage rectifying fixture 82 is shown positioned in the work station 68 with the top ends of the guide members 70 extending through the aligning holes 92 of the fixture base 84. A long-handled lifting tool (not shown) threaded at its lower end 126 into a threaded central bore 128 in the base plate 86 is used to move the fixture 82 into the starting position shown in FIGS. 17 and 18, and also to move the fixture further toward the guide thimbles 14 to carry out the rectifying operations.

Normally, only one type of damage condition would exist at one time, and even then infrequently, in a given fuel assembly and thus each damage rectifying operation using an appropriate one of the tools 94,96,98 would be carried out separately. However, for purposes of explaining the three types of damage and the three tools 94,96,98 which can be used by the fixture 82 of the present invention to rectify the damage, the three different damage conditions are shown as existing at the same time on the fuel assembly guide thimbles 14 in FIG. 18 and will thus be rectified generally at the same time by the three different tools. Therefore, in FIGS. 17 and 18, the fixture 82 is illustrated with one compresser socket tool 94, one expander pin tool 96, one cutter tool 98 and four non-compresser socket elements 102 aligned with corresponding damaged and undamaged guide thimble upper end portions 44a-c and 44d. Note that the four socket elements 102 are mounted in four different quadrants of the base plate 86 corresponding to the four different quadrants of the fuel assembly 10.

Downward movement of the long-handled tool (not shown), being connected at its lower end 126 to the base 84, moves the fixture 82 from its starting position in FIG. 18 to its maximum lowered position in FIG. 19 in which the four socket positioning elements 102 are seated on four undamaged guide thimble upper end portions 44d. As the fixture 82 is lowered, the compresser socket tool 94 and expander pin tool 96 move toward the respective damaged upper end portions 44a,44b of the guide thimble 14a,14b into contact therewith. Engagement of the tapered lower edge 114 of the tool 94 and the tapered lower end 122 of the tool 96 with the respective bent segments 80a,80b of the guide thimbles 14a,14b initiates corrective bending of the segments back to their original positions concurrently as the fixture 82 and elements 102 tools 94,96 therewith are lowered. Each of the damaged guide thimble upper end portions 44a,44b are forceably returned and plastically set to an effective outside diameter that permits subsequent entry into the passageways 42 of the top nozzle adapter plate 40. In such manner, the tools 94,96 being adapted to rectify the two types of repairabale damage are operated to rectify the corresponding types of guide thimble segment damage.

In addition, the above-described movement of the fixture 82 toward the guide thimbles 14 places the cutter tool 98 within the irreparably damaged upper end portion 44c of the guide thimble 14c with its cutter blades 130 at an operative position to sever the section 124 of the guide thimble which contains the irreparably damaged segment 80c. The cutter tool 98 is connected with and operated by the lower end 132 of a long-handled cutter operating tool (not shown). When the damaged section 124 has been severed, the radial advancement of the cutter blades 130 captures the cut-off section for removal when the fixture 82 is withdrawn from the work station 68, as shown in FIG. 20.

TOP NOZZLE/GUIDE THIMBLE NON-STRUCTURAL JOINTS

Whereas the first and second types of damage have now been corrected and the repaired upper end portions 44a,44b of the guide thimbles 14a,14b are ready to receive the top nozzle adapter plate 40 to complete structural joints therewith, the severed upper end portion 44c of the guide thimble 14c cannot complete such a joint with the top nozzle. Instead without some additional corrective measure, a open space or gap will be left between the severed upper edge 134 of the guide thimble 14c and the adapter plate 40, allowing disruptive coolant cross flow through the gap and across the open upper end of the severed guide thimble 14c.

Turning now to FIGS. 21 through 24, the solution provided by the invention of the last cross-referenced application is to mount an adapter sleeve 136 in each of the passageways in the top nozzle adapter plate 40 that is aligned with a severed guide thimble 14c. The adapter sleeve 136 is of a length longer than that of the damaged section 124 severed from the guide thimble 14c. An upper portion 138 of the adapter sleeve 136 has generally the same length and outside diameter size as that of the severed section 124, whereas a lower portion 140 is much shorter in length but has a larger outside diameter. The lower portion 140 of the adapter sleeve 136 is sized to snugly fit over the severed upper end portion 44c of the severed guide thimble 14c, as seen in FIG. 24, and provide a slip fit joint therewith in which there is no rigid connection between the sleeve 136 and guide thimble 14c when the top nozzle 22 is replaced back on the undamaged and repaired upper end portions 44d,44a of the guide thimbles 14. By way of example, the adapter sleeve 136 can be approximately 1.5 inches long with the same inside and outside diameters as the severed section 124 over its upper portion 138 which is approximately one inch in length. The 0.5 inch lower portion 140 is expanded to a diameter that allows a close-clearance fit with the outside diameter of the remaining upper end portion 44c (the portion of the insert sleeve which remains fastened to the guide thimble 14c).

The above solution requires no changes to the manufactured top nozzle, but only the mechanical attachment of the one (or more) adapter sleeve 136 to the adapter plate 40. The sleeve is permanently connected to the adapter plate by a simple roll-formed circumferential bulge 142 formed in the sleeve 136 so as to extend into the adapter plate passageway groove 48. The nature of the modification permits using the original top nozzle 22 removed from the fuel assembly 10 or a new replacement nozzle, if desired.

The adapter sleeve 136 does not provide a structural joint between the top nozzle 22 and respective one guide thimble 14c of the fuel assembly skeleton. However, because of conservative load margins for structural joints connecting the top nozzle to the skeleton, some of the structural joints (provided by the attaching structure 46 in FIG. 7) can be eliminated without violating design criteria. Since the adapter sleeve 136 forms part of a non-structural joint, generally designated 144 in FIG. 24, it carries no load. The load of the fuel assembly 10 is carried by the remaining structural joints (attaching structure) 46. These structural joints 46 each support a greater load than they did before the damage occured when the full complement of joints shared the load. However, depending upon the fuel configuration, at least four to six sections 124 can be deleted without exceeding design limits on the remaining structural joints 46. To state it another way, in a fuel assembly having 24 guide thimbles, there should be at least three times as many structural as non-structural joints between the top nozzle and the guide thimbles.

The adapter sleeve 136 is made of the same material, stainless steel, as the section 124 of the upper end portion 44c (or insert sleeve). The adapter sleeve 136 requires no locking tube 50, although locking tubes are inserted into the sleeves to maintain the same inside dimensions as normal top nozzle joints.

The adapter sleeve 136 can be quickly installed, remotely, under water into irradiated nozzle adapter plates 40 or they can be installed into new, unirradiated replacement nozzles by a "hands-on" procedure. After the number of adapter sleeves 136 required have been mounted in the corresponding adapter plate passageways 42 which are aligned with the severed guide thimble 14c, the top nozzle 22 can be mounted to the skeleton in the normal manner using standard reconstitution fixturing, tooling, and in accordance with the same procedures developed for standard removable top nozzle handling. The aforementioned modification in no way compromises subsequent reconstitutions which may be necessary for that fuel assembly.

Therefore, the purpose of the adapter sleeve 136 is to bridge the gap between the top of the severed upper edge 134 of the guide thimble 14c and the adapter plate 140, and thereby provide a continuous protective enclosure for the core component installed in the fuel assembly, i.e., either a control rod, a thimble plug, or a BPRA rod. The adapter sleeve 136 precludes cross flow against the core component and maintains the normal upward flow path of the primary coolant both inside and outside of the guide thimble. In all probability, the fuel assembly skeleton will be provided with a large majority of structural joints 46 and a small minority of non-structural joints 144 between its top nozzle adapter plate 40 and its guide thimbles 14.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A guide thimble damage-rectifying fixture for use on a reconstitutable fuel assembly being held in a work station with its top nozzle removed to expose a plurality of guide thimbles of said assembly, at least one of said guide thimbles having one of several different types of damage, said fixture comprising:
    (a) a base having a plurality of tool positioning openings defined therein in a pattern matched with that of said guide thimbles of said fuel assembly;
    (b) means for mounting said base on said work station with its tool positioning openings in alignment with said guide thimbles of said fuel assembly;
    (c) a plurality of different tools selectively mountable in said openings of said base, each tool being operable to rectify one of said different types of guide thimble damage; and
    (d) a group of positioning elements selectively mounted in a corresponding number of said openings of said base and being mountable upon upper end portions of corresponding undamaged ones of said guide thimbles for precisely locating said fixture relative to said guide thimbles for accurate performance of said damage rectifying operation by each of said tools.

2. The fixture as recited in claim 1, further comprising:
    means for moving said base toward said guide thimbles so as to cause engagement with a guide thimble, and concurrently therewith operation, of each of said tools being mounted on said base which is adapted to rectify a respective one of said different types of guide thimble damage which is repairable.

3. The fixture as recited in claim 1, further comprising:

means for moving said base toward said guide thimbles so as to cause placement at an operative position relative to a guide thimble of each of said tools being mounted on said base which is adapted to rectify a respective one of said different types of guide thimble damage which is irreparable.

4. The fixture as recited in claim 1 wherein one of said tools is a compressor socket operable to rectify repairable damage to one of said guide thimbles in the form of an outwardly bent upper end portion thereof by compressing said bent portion inward to its original position.

5. The fixture as recited in claim 1, wherein one of said tools is an expander pin operable to rectify repairable damage to one of said guide thimbles in the form of an inwardly bent upper end portion thereof by expanding said bent portion outward to its original position.

6. The fixture as recited in claim 1, wherein one of said tools is a cutter operable to rectify irreparable damage to an upper end portion of one of said guide thimbles by severing and capturing the irreparably damaged portion.

7. The fixture as recited in claim 1, wherein each of said positioning elements is a non-compressor socket adapted to mount on the upper end portion of the undamaged ones of said guide thimbles.

8. A guide thimble damage-rectifying fixture for use on a reconstitutable fuel assembly being held in a work station with its top nozzle removed to expose axially segmented upper end portions of a purality of guide thimbles of said fuel assembly, at least one of said guide thimbles having one of several different types of repairable and irreparable upper end portion segment damage, said fixture comprising:
  (a) a base having a plurality of tool positioning openings defined therein in a pattern matched with that of said guide thimbles of said fuel assembly;
  (b) means for mounting said base on said work station with its tool positioning openings in alignment with said guide thimbles of said fuel assembly;
  (c) a plurality of different tools selectively mountable in said openings of said base, each tool being adapted to operate to rectify a different one of said types of repairable and irreparable guide thimble upper end portion segment damage;
  (d) means for moving said base toward said guide thimbles so as to cause engagement with a guide thimble, and concurrently therewith operation, of each of said tools being mounted on said base which is adapted to rectify a respective one of said different types of guide thimble upper end portion segment damage which is repairable;
  (e) said moving means also for moving said base toward said guide thimbles so as to cause placement at an operative position relative to a guide thimble of each of said tools being mounted on said base which is adapted to rectify a respective one of said different types of guide thimble damage which is irreparable; and
  (f) a group of positioning elements mounted in selected ones of said openings of said base and being mountable upon upper end portions of corresponding undamaged ones of said guide thimbles for precisely locating said fixture relative to said guide thimble upper end portions for accurate performance of said repairable damage rectifying operation by said tools as said fixture is moved toward said guide thimbles.

9. The fixture as recited in claim 8, wherein one of said tools is a compressor socket operable to rectify repairable damage to a guide thimble upper end portion having an outwardly bent segment by compressing the segment inward to its original position.

10. The fixture as recited in claim 8, wherein one of said tools is an expander pin operable to rectify repairable damage to a guide thimble upper end portion having an inwardly bent segment by expanding the segment outward to its original position.

11. The fixture as recited in claim 8, wherein one of said tools is a precision internal cutter operable to rectify irreparable damage to a guide thimble upper end portion segment by severing and capturing a predetermined section of said guide thimble upper end portion including the irreparably damaged segment.

12. The fixture as recited in claim 8, wherein each of said group of positioning elements is a non-compresser socket adapted to mount on said one undamaged guide thimble upper end portion.

13. A guide thimble damage-rectifying method for use on a reconstitutable fuel assembly being held in a work station with its top nozzle removed to expose a plurality of guide thimbles having one of several different types of damage, said method comprising the steps of:
  (a) providing a base having a plurality of tool positioning openings defined therein in a pattern matched with that of said guide thimbles of said fuel assembly;
  (b) mounting said base on said work station with its tool positioning openings in alignment with said guide thimbles of said fuel assembly and such that said base is movable toward said guide thimbles;
  (c) providing a plurality of different tools each operable to rectify one of said different types of guide thimble damage;
  (d) mounting selected ones of said plurality of different tools in respective ones of said openings of said base in alignment with ones of said guide thimbles having said respective types of guide thimble damage capable of being rectified by said selected tools such that upon movement of said base toward said guide thimbles said respective types of guide thimble damage will be rectified by said selected tools;
  (e) providing a group of positioning elements;
  (f) mounting said positioning elements in selected ones of said base openings corresponding to undamaged ones of said guide thimbles such that upon movement of said base toward said guide thimbles said positioning elements become mounted on upper end portions of said corresponding undamaged ones of said guide thimbles for precisely locating said fixture relative to said guide thimble upper end portions for accurate performance of said repairable damage rectifying operation by said tools as said base is moved toward said guide thimbles; and
  (g) moving said base toward said guide thimbles so as to mount said positioning elements on said corresponding ones of said undamaged guide thimbles and effect rectification of said damaged guide thimbles by said selected tools.

14. The method as recited in claim 13, wherein the step of moving said base toward said guide thimbles causes engagement with a guide thimble, and concurrently therewith operation, of each of said tools being mounted on said base which is adapted to rectify a respective one of said different types of guide thimble damage which is repairable.

15. The method as recited in claim 13, wherein the step of moving said base toward said guide thimbles causes placement at an operative position relative to a guide thimble of each of said tools being mounted on said base which is adapted to rectify a respective one of said different types of guide thimble damage which is irreparable.

* * * * *